United States Patent
Lee et al.

(10) Patent No.: US 9,433,014 B2
(45) Date of Patent: Aug. 30, 2016

(54) DEVICE TO DEVICE COMMUNICATION METHOD AND DEVICE FOR PERFORMING SAME

(71) Applicant: LG ELECTRONICS INC., Seoul (KR)

(72) Inventors: Jihyun Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/377,481

(22) PCT Filed: Feb. 13, 2013

(86) PCT No.: PCT/KR2013/001126
§ 371 (c)(1),
(2) Date: Aug. 7, 2014

(87) PCT Pub. No.: WO2013/122384
PCT Pub. Date: Aug. 22, 2013

(65) Prior Publication Data
US 2015/0016410 A1    Jan. 15, 2015

Related U.S. Application Data

(60) Provisional application No. 61/598,900, filed on Feb. 14, 2012.

(51) Int. Cl.
*H04W 72/12* (2009.01)
*H04L 1/18* (2006.01)
*H04W 76/02* (2009.01)

(52) U.S. Cl.
CPC ............ *H04W 72/1263* (2013.01); *H04L 1/18* (2013.01); *H04W 76/023* (2013.01)

(58) Field of Classification Search
CPC ................................... H04W 72/1263
USPC .................................... 370/330, 329
See application file for complete search history.

(56) References Cited

U.S. PATENT DOCUMENTS 8,824,968 B2 * 9/2014 Kim ................. H04L 5/0091
370/329
8,897,241 B2 * 11/2014 Vujcic ................ H04L 5/003
370/329

(Continued)

FOREIGN PATENT DOCUMENTS

KR    10-2008-0113837    12/2008
KR    10-2009-0003946    1/2009

(Continued)

OTHER PUBLICATIONS

PCT International Application No. PCT/KR2013/001126, Written Opinion of the International Searching Authority dated Jun. 11, 2013, 1 page.

*Primary Examiner* — Parth Patel
(74) *Attorney, Agent, or Firm* — Lee Hong Degerman Kang & Waimey; Jonathan Kang; Jeffrey Lotspeich

(57) ABSTRACT

Provided is a method for performing device-to-device communication between a first user equipment (UE) and a second UE in a wireless communication system, the method comprising: receiving reception scheduling information for D2D communication from a base station in a first frequency band, receiving data for D2D communication from the second UE in a second frequency band based on the reception scheduling information and transmitting feedback information to the base station in response to reception of the data for D2D communication in the second frequency band, wherein the reception scheduling information is received in a subframe different from a subframe including transmission scheduling information associated with the reception scheduling information, and wherein the reception scheduling information indicates resources on which the first UE receives the data from the second UE and the transmission scheduling information indicates resources on which the second UE transmits the data to the first UE.

16 Claims, 11 Drawing Sheets

(56) References Cited

U.S. PATENT DOCUMENTS

| | | | | |
|---|---|---|---|---|
| 9,030,972 B2* | 5/2015 | Horneman | ........... | H04W 72/042 370/280 |
| 2009/0088605 A1* | 4/2009 | Ross | .................... | A61B 5/0002 600/300 |
| 2009/0325625 A1* | 12/2009 | Hugl | .................... | H04W 52/16 455/522 |
| 2010/0135238 A1* | 6/2010 | Sadri | ................ | H04W 72/0453 370/329 |
| 2011/0053495 A1* | 3/2011 | Hara | ................ | H04B 7/15542 455/7 |
| 2011/0268004 A1* | 11/2011 | Doppler | ................ | H04W 72/02 370/311 |
| 2011/0268006 A1* | 11/2011 | Koskela | ............. | H04W 72/121 370/312 |
| 2012/0230260 A1* | 9/2012 | Virtej | .................... | H04W 24/02 370/329 |
| 2012/0327830 A1* | 12/2012 | Hamaguchi | ............ | H04J 11/003 370/311 |
| 2013/0114530 A1* | 5/2013 | Chen | .................... | H04W 72/042 370/329 |
| 2013/0230032 A1* | 9/2013 | Lu | .......................... | H04W 72/02 370/336 |
| 2013/0258989 A1* | 10/2013 | Ribeiro | ............... | H04W 72/082 370/329 |
| 2014/0038653 A1* | 2/2014 | Mildh | ................ | H04W 28/048 455/501 |
| 2014/0122607 A1* | 5/2014 | Fodor | ................. | H04W 76/023 709/204 |
| 2014/0342747 A1* | 11/2014 | Lee | ........................ | H04L 5/0053 455/450 |
| 2015/0016368 A1* | 1/2015 | Dai | .................... | H04W 72/042 370/329 |
| 2015/0016410 A1* | 1/2015 | Lee | ........................... | H04L 1/18 370/330 |

FOREIGN PATENT DOCUMENTS

| | | |
|---|---|---|
| KR | 10-2009-0005676 | 1/2009 |
| KR | 10-2009-0062435 | 6/2009 |
| KR | 10-2011-0089311 | 8/2011 |

* cited by examiner

DEVICE TO DEVICE COMMUNICATION METHOD AND DEVICE FOR PERFORMING SAME

CROSS-REFERENCE TO RELATED APPLICATIONS

This application is the National Stage filing under 35 U.S.C. 371 of International Application No. PCT/KR2013/001126, filed on Feb. 13, 2013, which claims the benefit of U.S. Provisional Application Serial No. 61/598,900, filed on Feb. 14, 2012, the contents of which are all hereby incorporated by reference herein in their entirety.

TECHNICAL FIELD

The present invention relates to a wireless communication system and, more particularly, to a method for performing user equipment (UE)-to-UE communication and device-to-device (D2D) communication, a method for supporting D2D communication and a device for performing the same.

BACKGROUND ART

In cellular communication, a user equipment (UE) existing in a cell accesses a base station to receive control information for exchanging data from the base station in order to perform communication and then transmit and receive data to and from the base station. That is, since the UE transmits and receives data via the base station, the UE transmits data to the base station in order to transmit the data to another cellular UE and the base station, which has received the data, transmit the received data to another UE. Since the UE must transmit data to another UE via the base station, the base station schedules channels and resources for data transmission and reception and transmits channels and resource scheduling information to each UE. In order to perform UE-to-UE communication via a base station, the base station needs to assign channels and resources for transmitting and receiving data to each UE. However, in D2D communication, a UE directly transmits and receives a signal to a desired UE without via a base station or a relay.

If UE-to-UE communication or D2D communication for directly transmitting and receiving data between UEs is performed by sharing resources with an existing cellular network, each UE may perform UE-to-UE communication after resource assignment for UE-to-UE communication. However, in communication between UEs using different frequencies, it is necessary to determine operating frequencies upon resource assignment. That is, one of first and second UEs, which subscribe to different communication operators, may move to an operating frequency of a peer UE for D2D communication or D2D communication is performed at a third frequency.

DISCLOSURE

Technical Problem

An object of the present invention devised to solve the problem lies in transmission of transmission/reception scheduling information for D2D communication, D2D communication based on the transmission/reception scheduling information, and transmission of information on feedback on D2D communication data reception.

Another object of the present invention devised to solve the problem lies in a method for avoiding collision between acknowledgement (ACK)/negative acknowledgement (NACK) for D2D communication and ACK/NACK resources for non-D2D communication.

The technical problems solved by the present invention are not limited to the above technical problems and other technical problems which are not described herein will become apparent to those skilled in the art from the following description.

Technical Solution

The object of the present invention can be achieved by providing a method for performing device-to-device communication between a first user equipment (UE) and a second UE in a wireless communication system including receiving reception scheduling information for D2D communication from a base station in a first frequency band, receiving data for D2D communication from the second UE in a second frequency band based on the reception scheduling information and transmitting feedback information to the base station in response to reception of the data for D2D communication in the second frequency band, wherein the reception scheduling information is received in a subframe different from a subframe including transmission scheduling information associated with the reception scheduling information, and wherein the reception scheduling information indicates resources on which the first UE receives the data from the second UE and the transmission scheduling information indicates resources on which the second UE transmits the data to the first UE.

Preferably, the reception scheduling information and the transmission scheduling information may indicate identical time-frequency resources.

Preferably, the transmission scheduling information may be included in an n-th subframe of the first frequency band and the reception scheduling information may be received in an (n+m)-th subframe of the first frequency band, where n and m are positive integers.

Preferably, the data may be received on a subframe of the second frequency band having the same index as the index of a subframe of the first frequency band, in which the reception scheduling information is received.

In another aspect of the present invention, provided herein is a method for, at a base station, supporting device-to-device communication between a first user equipment (UE) and a second UE in a wireless communication system including transmitting transmission scheduling information for D2D communication and reception scheduling information associated with the transmission scheduling information in a first frequency band and receiving feedback information in response to transmission of data for D2D communication in a second frequency band, wherein the transmission scheduling information and the reception scheduling information are transmitted in different subframes in the first frequency band, and wherein the transmission scheduling information indicates resources on which the second UE transmits the data to the first UE and the reception scheduling information indicates resources on which the first UE receives the data from the second UE.

Preferably, the reception scheduling information and the transmission scheduling information may indicate identical time-frequency resources.

Preferably, the transmission scheduling information may be transmitted in an n-th subframe of the first frequency band and the reception scheduling information may be transmitted in an (n+m)-th subframe of the first frequency band, where n and m are positive integers.

Preferably, a transmission of the data may be performed in a subframe of the second frequency band having the same index as the index of a subframe of the first frequency band, in which the reception scheduling information is transmitted.

In another aspect of the present invention, provided herein is a first user equipment (UE) configured to perform device-to-device (D2D) communication with a second UE in a wireless communication system including a radio frequency (RF) unit configured to transmit or receive an RF signal and a processor configured to control the RF unit, wherein the processor is configured to receive reception scheduling information for D2D communication from a base station through the RF unit in a first frequency band, to receive data for D2D communication from the second UE in a second frequency band based on the reception scheduling information and to transmit feedback information to the base station in response to reception of the data for D2D communication in the second frequency band, wherein the reception scheduling information is received on a subframe different from a subframe in which transmission scheduling information associated with the reception scheduling information is transmitted, and wherein the reception scheduling information indicates resources on which the first UE receives the data from the second UE and the transmission scheduling information indicates resources on which the second UE transmits the data to the first UE.

Preferably, the reception scheduling information and the transmission scheduling information may indicate identical time-frequency resources.

Preferably, the transmission scheduling information may be included in an n-th subframe of the first frequency band and the reception scheduling information may be received in an (n+m)-th subframe of the first frequency band, where n and m are positive integers.

The data may be received on a subframe of the second frequency band having the same index as the index of a subframe of the first frequency band, in which the reception scheduling information is received.

In another aspect of the present invention, provided herein is a base station configured to support device-to-device (D2D) communication between a first user equipment (UE) and a second UE in a wireless communication system including a radio frequency (RF) unit configured to transmit or receive an RF signal and a processor configured to control the RF unit, wherein the processor is configured to transmit transmission scheduling information for D2D communication and reception scheduling information associated with transmission scheduling information through the RF unit in a first frequency band and to receive feedback information in response to transmission of data for D2D communication in a second frequency band, wherein the transmission scheduling information and the reception scheduling information are transmitted in different subframes in the first frequency band, and wherein the transmission scheduling information indicates resources on which the second UE transmits the data to the first UE and the reception scheduling information indicates resources on which the first UE receives the data from the second UE.

Preferably, the reception scheduling information and the transmission scheduling information may indicate identical time-frequency resources.

Preferably, the transmission scheduling information may be transmitted in an n-th subframe of the first frequency band and the reception scheduling information may be transmitted in an (n+m)-th subframe of the first frequency band, where n and m are positive integers.

Preferably, a transmission of the data may be performed in a subframe of the second frequency band having the same index as the index of a subframe of the first frequency band, in which the reception scheduling information is transmitted.

It is to be understood that both the foregoing general description and the following detailed description are merely exemplary of the invention, and are intended to provide an overview or framework for understanding the nature and character of the invention as claimed.

Advantageous Effects

According to one embodiment of the present invention, it is possible to efficiently assign radio resources for D2D communication. In addition, it is possible to stably perform ACK/NACK transmission/reception in a D2D communication system via ACK/NACK resource assignment for D2D communication and/or an ACK/NACK transmission/reception method using the resources. In addition, it is possible to efficiently use radio resources for D2D communication via ACK/NACK transmission/reception.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a better understanding of the invention, illustrate embodiments of the invention and together with the description serve to explain the principle of the invention.

BEST MODE

Figure 1:
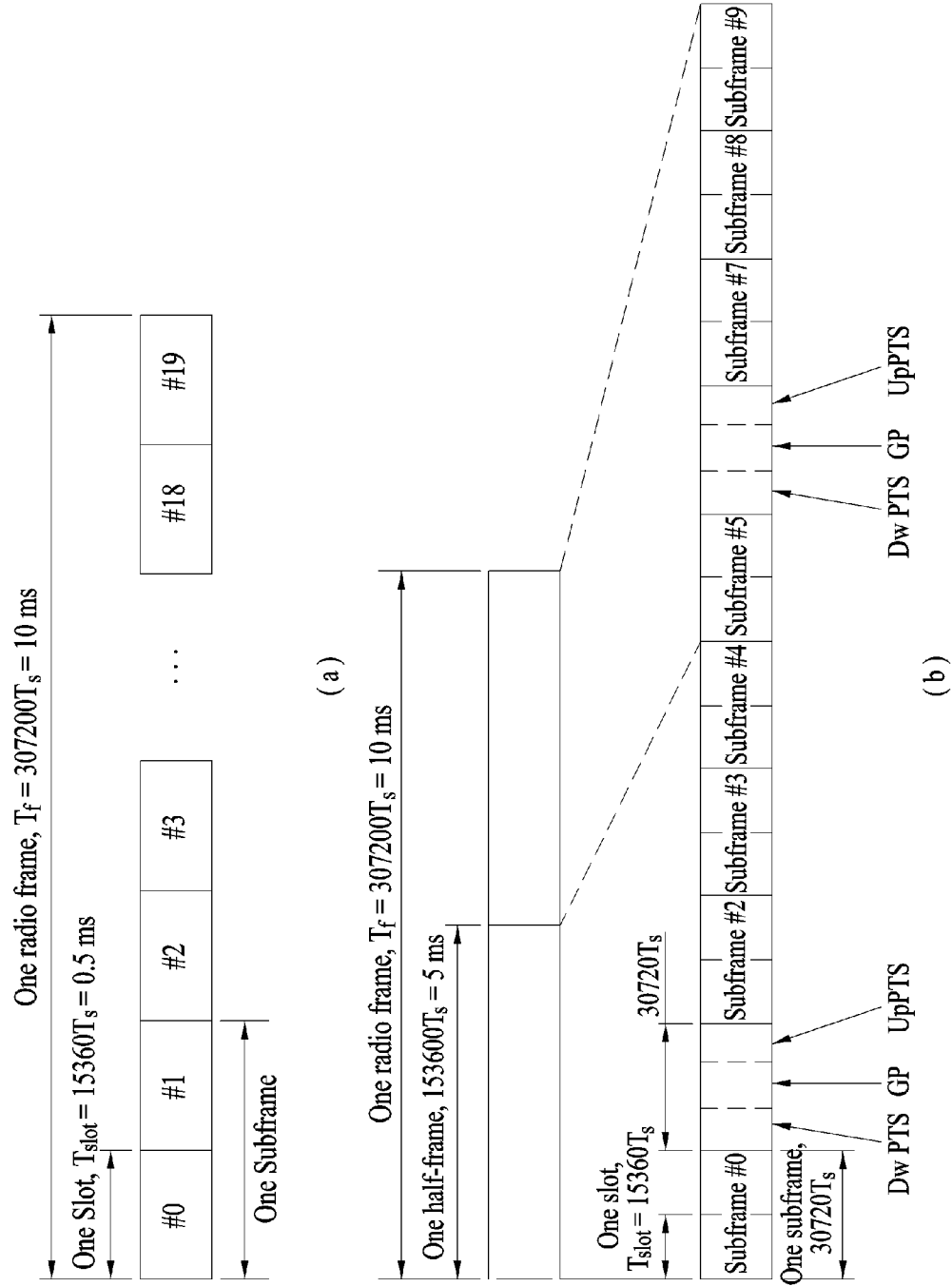
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals.

In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
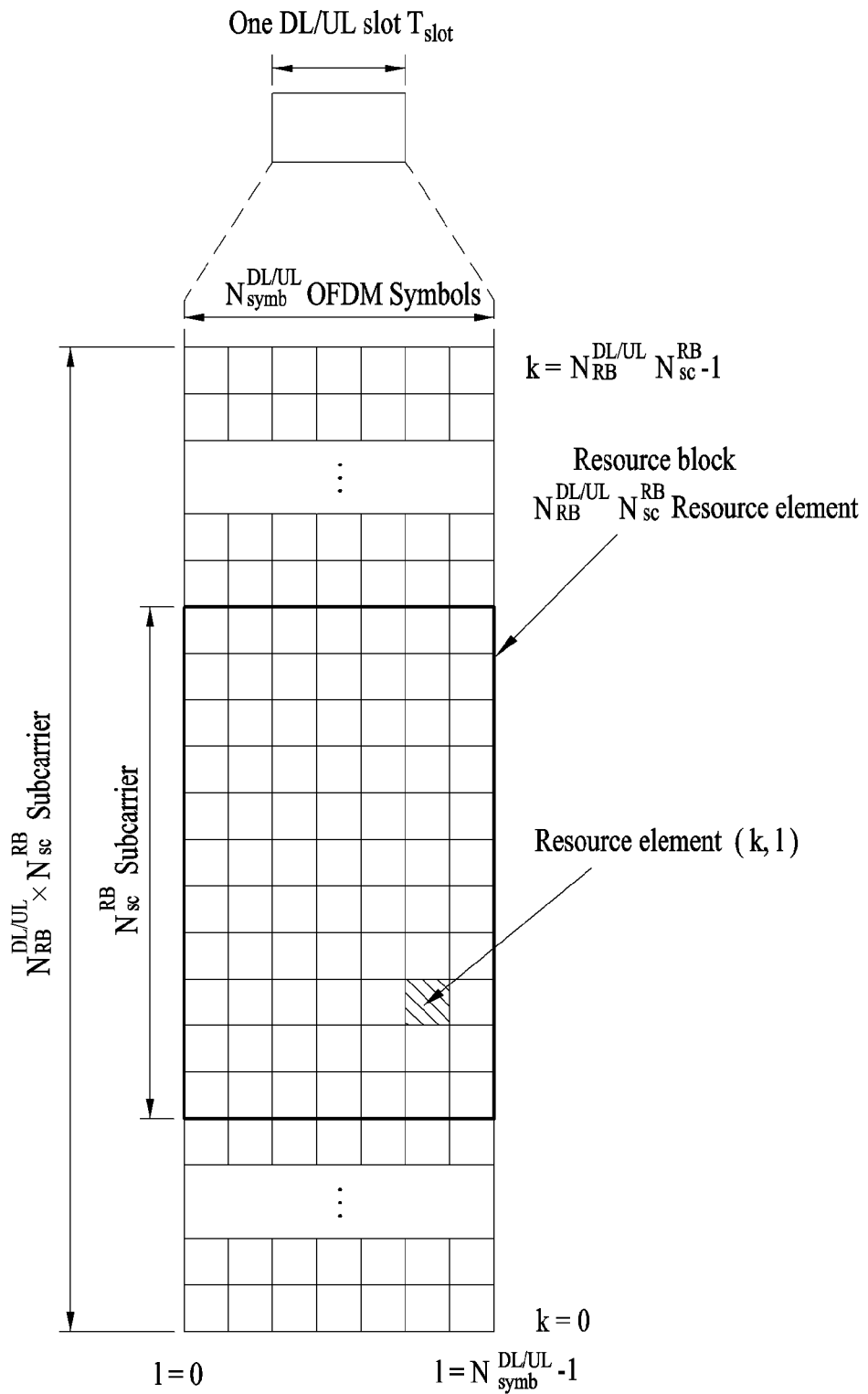
FIG. 2 is a diagram showing an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
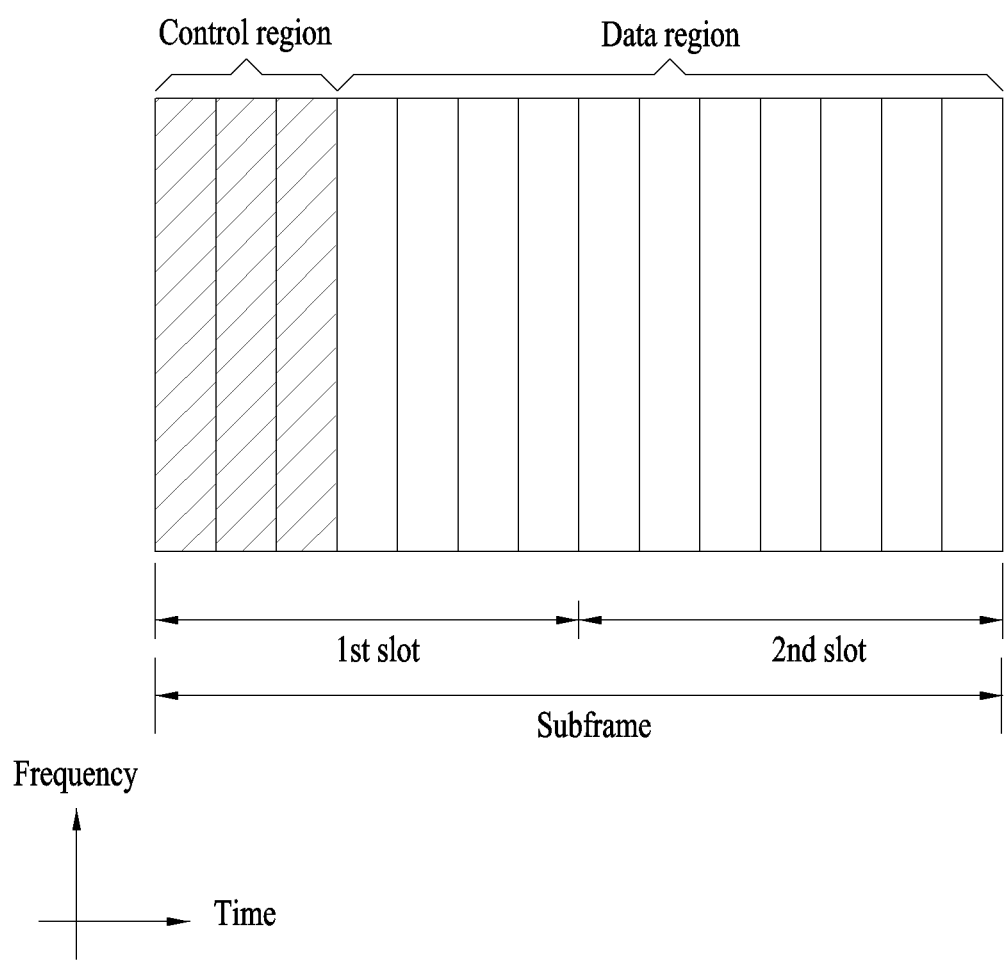
FIG. 3 is a diagram showing a downlink subframe structure used in a $3^{rd}$ Generation Partnership Project (3GPP) long term evolution (LTE)(-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
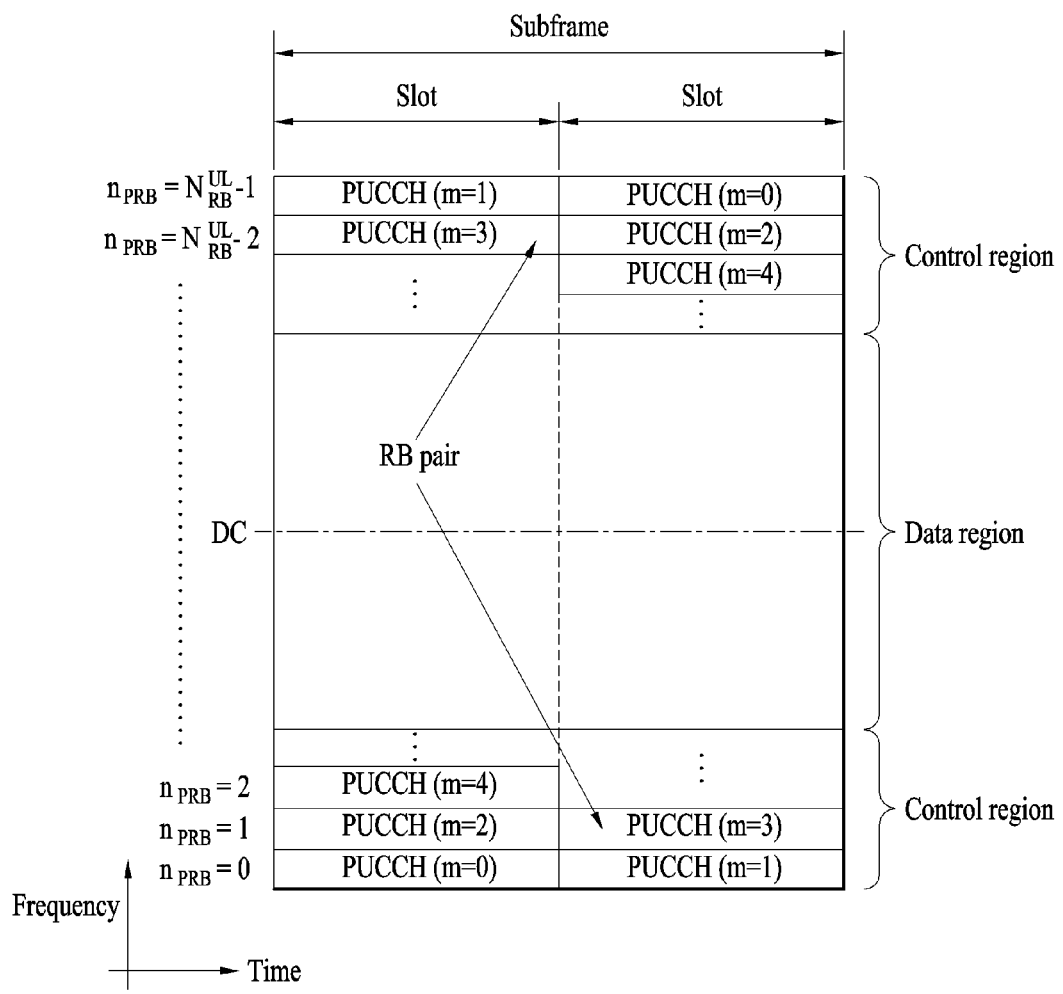
FIG. 4 is a diagram showing an uplink subframe structure used in a $3^{rd}$ Generation Partnership Project (3GPP) long term evolution (LTE)(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data.

The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

A UE is assigned a PUCCH resource for UCI transmission by an eNB through an explicit scheme using a higher-layer signal or through an implicit scheme using a dynamic control signal. Physical resources used for PUCCHs depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{sc}$. The parameter $N^{(1)}_{CS}$ indicates the number of cyclic shifts used for PUCCH format 1/1a/1b in an RB used for a mixture of format 1/1a/1b and format 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ is provided by higher layers. If $N^{(1)}_{CS}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,p)}_{PUCCH}$, $n^{(2,p)}_{PUCCH} < N^{(2)}_{RB} \cdot N^{RB}_{sc} + \text{ceil}(N^{(1)}_{cs}/8) \cdot (N^{RB}_{sc} - N^{(1)}_{cs} - 2)$, and $n^{(3,p)}_{PUCCH}$, respectively, which are indexes of non-negative integer indexes.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \left\lfloor \frac{m}{2} \right\rfloor & \text{if}(m+n_s \bmod 2) \bmod 2 = 0 \\ N^{UL}_{RB} - 1 - \left\lfloor \frac{m}{2} \right\rfloor & \text{if}(m+n_s \bmod 2) \bmod 2 = 1 \end{cases}$$ [Equation 1]

In Equation 1, a parameter m depends on a PUCCH format. PUCCH format 1/1a/1b, PUCCH format 2/2a/2b, and PUCCH format 3 are given by Equation 3, Equation 3, and Equation 4, respectively.

$$m = \begin{cases} N^{(2)}_{RB} & \text{if } n^{(1,\tilde{p})}_{PUCCH} < c \cdot N^{(1)}_{cs} / \Delta^{PUCCH}_{shift} \\ \left\lfloor \frac{n^{(1,p)}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + & \text{otherwise} \\ N^{(2)}_{RB} + \left\lceil \frac{N^{(1)}_{cs}}{8} \right\rceil \end{cases}$$ [Equation 2]

$$c = \begin{cases} 3 & \text{normal cyclic prefix} \\ 2 & \text{extended cyclic prefix} \end{cases}$$

In Equation 2, $n^{(1,p)}_{PUCCH}$ denotes a PUCCH resource index of an antenna port p for PUCCH format 1/1a/1b. In the case of an ACK/NACK PUCCH, $n^{(1,p)}_{PUCCH}$ is a value implicitly determined by the first CCE index of a PDCCH carrying scheduling information of a corresponding PDSCH.

$$m = \lfloor n^{(2,\tilde{p})}_{PUCCH} / N^{RB}_{sc} \rfloor$$ [Equation 3]

where $n^{(2,p)}_{PUCCH}$ denotes a PUCCH resource index of an antenna port p for PUCCH format 2/2a/2b and is a value transmitted to a UE from an eNB through higher-layer signaling.

$$m = \lfloor n^{(3,\tilde{p})}_{PUCCH} / N^{PUCCH}_{SF,0} \rfloor$$ [Equation 4]

$n^{(3,p)}_{PUCCH}$ denotes a PUCCH resource index of an antenna port p for PUCCH format 3 and is a value transmitted to a UE from an eNB through higher-layer signaling.

$N^{PUCCH}_{SF,0}$ indicates a spreading factor for the first slot of a subframe. For all of two slots of a subframe using normal PUCCH format 3, $N^{PUCCH}_{SF,0}$ is 5. For first and second slots of a subframe using a reduced PUCCH format 3, $N^{PUCCH}_{SF,0}$ is 5 and 4, respectively.

Upon referring to Equation 2, PUCCH resources for ACK/NACK are not pre-allocated to each UE and a plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data. An entire region in which the PDCCH is transmitted in each DL subframe includes a plurality of CCEs and the PDCCH transmitted to the UE is composed of one or more CCEs. The UE transmits ACK/NACK through a PUCCH resource linked to a specific CCE (e.g. first CCE) among the CCEs constituting the PDCCH received thereby. Hereinafter, PUCCH resources for transmitting ACK/NACK which are dynamically determined in associated with PDCCH is referred to as ACK/NACK PUCCH resources.

ACK/NACK is control information feedback from a receiving end to a transmitting end according to whether or not data is decoded successfully or not. For example, if the UE succeed in decoding DL data, ACK is transmitted; otherwise, NACK is transmitted to the eNB. More specifically, in LTE system, cases for a need of ACK/NACK transmission are divided into three cases.

First, the case is when the ACK/NACK is transmitted for PDSCH indicated by detection of PDCCH. Second, the case is when ACK/NACK is transmitted for PDCCH indicating SPS (semi-persistent scheduling) release. Third, ACK/NACK is transmitted for PDSCH transmitted without detection of PDCCH, this means ACK/NACK transmission for SPS. Unless explicitly mentions for following description, ACK/NACK transmission scheme is not limited to one of the three cases.

Figure 5:
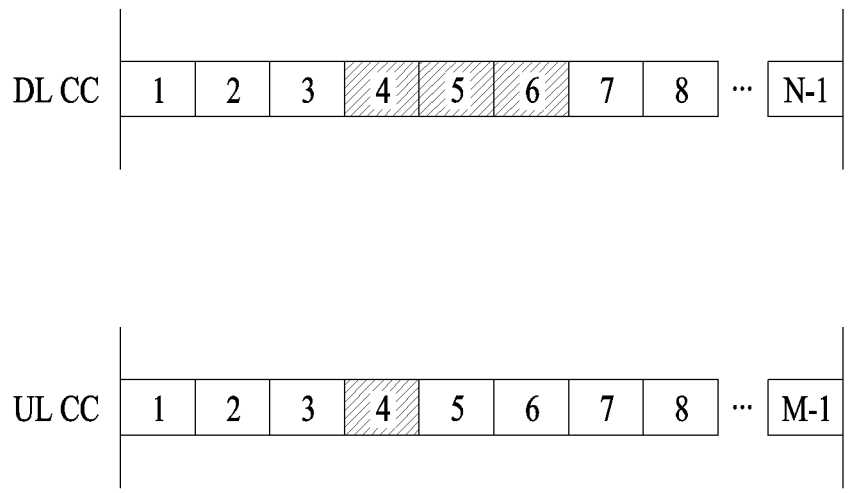
FIG. 5 is a diagram showing an example of assigning ACK/NACK resources in a 3GPP LTE(-A) system.

FIG. 5 illustrates PUCCH resources on which ACK/NACK for PDSCH is transmitted. Each rectangular on DL CC represents a CCE and each rectangular represents a PUCCH. It can be assumed that a UE may obtain PDSCH related information via PDCCH consisting of CCEs indexed 4 to 6, and then receive PDSCH. In this case, the UE transmits ACK/NACK to the BS through a PUCCH derived or calculated from CCE index 4, which is the lowest CCE of the PDCCH, for example, through PUCCH index 4. FIG. 5 shows an example in which up to N CCEs are present in a DL subframe and up to M PUCCH resources are present in a UL subframe. Although N may be equal to M, N may be different from M and CCEs and PUCCH resources may be mapped in an overlapping manner.

In FDD system, a UE may transmit HARQ ACK/NACK in a subframe having index n, in response to PDSCH transmission received in a subframe having index n−k (for example, k=4 in LTE system). The UE may determine a subframe index for transmitting HARQ ACK/NACK in a subframe having index based on PDCCH indicating transmission of PDSCH in a subframe having index n−k.

For example, a PUCCH resource index may be determined as follows.

$$n_{PUCCH}^{(1)} = n_{CCE} + N_{PUCCH}^{(1)}$$ [Equation 5]

Here, $n^{(1)}_{PUCCH}$ is a PUCCH resource index for ACK/NACK transmission, $N^{(1)}_{PUCCH}$ is a signaling value received from a higher layer, and $n_{CCE}$ denotes the lowest CCE index used for PDCCH transmission. Cyclic shift, orthogonal spread code and PRB (physical resource block) for PUCCH format 1a/1b are obtained from $n^{(1)}_{PUCCH}$.

Upon referring to FIG. 5, each PUCCH resource index corresponds to a PUCCH resource for ACK/NACK. As shown in FIG. 5, assuming that PDSCH scheduling information is transmitted to the UE through a PDCCH consisting of CCEs indexed 4 to 6 and the CCE indexed 4 is linked to PUCCH resource index 4, the UE transmits ACK/NACK to the BS through a PUCCH derived or calculated from CCE index 4, which is the lowest CCE of the PDCCH, for example, through PUCCH index 4. Specifically, in the 3GPP LTE/LTE-A system, PUCCH resource indexes for transmission by two antenna ports ($p_0$ and $p_1$) are determined as follows.

$$n_{PUCCH}^{(1,\tilde{p}=p0)} = n_{CCE} + N_{PUCCH}^{(1)} \quad \text{[Equation 6]}$$

$$n_{PUCCH}^{(1,\tilde{p}=p1)} = n_{CCE} + 1 + N_{PUCCH}^{(1)} \quad \text{[Equation 7]}$$

Here, $n^{(1,\tilde{p}=p0)}_{PUCCH}$ denotes a PUCCH resource index (i.e. number) to be used by the antenna port $p_0$, $n^{(1,\tilde{p}=p1)}_{PUCCH}$ denotes a PUCCH resource index to be used by the antenna port $p_1$, and $N^{(1)}_{PUCCH}$ denotes a value signaled from a higher layer. $N^{(1)}_{PUCCH}$ corresponds to a location at which a dynamic PUCCH resource is stated among PUCCH resources of a cell. $n_{CCE}$ corresponds to the smallest value among CCE indexes used for PDCCH transmission. For example, when a CCE aggregation level is 2 or more, the first CCE index among a plurality of CCE indexes aggregated for PDCCH transmission is used to determine an ACK/NACK PUCCH resource.

Next, ACK/NACK transmission is discussed for TDD system.

In TDD, a DL transmission and a UL transmission is distinguished by time, so that subframes in one radio frame are indentified by DL subframe or UL subframe. UL-DL configuration for TDD refers to Table 1.

In a TDD system, the UE may transmit ACK/NACK for PDSCH transmissions in one or more DL subframes in one UL subframe. The UE may transmit HARQ ACK/NACK in UL subframe n, in response to PDSCH transmission received in DL subframe n−k, k depends on the UL-DL configuration. For example, a DL related set index K: $\{k_0, k_1, \ldots k_{M-1}\}$ may be given per UL-DL configuration of Table 1 as shown in Table 3.

the number of elements in the set K for subframe 2 is 4 in case of UL-DL configuration 2.

For TDD ACK/NACK bundling or TDD ACK/NACK multiplexing and a subframe n with M=1, the UE may determine PUCCH resource $n_{PUCCH}^{(1)}$ for transmission of HARQ ACK/NACK in subframe n as follows.

If there is PDSCH transmission indicated by the detection of corresponding PDCCH or there is PDCCH indicating downlink SPS release within subframe(s) n−k, where k∈K and K is a set of M elements $\{k_0, k_1, \ldots k_{M-1}\}$ depending on the subframe n and the UL-DL configuration, the UE first selects a p value out of $\{0, 1, 2, 3\}$ which makes $N_p \le n_{cCE} < N_{p+1}$. The PUCCH resource $n_{PUCCH}^{(1)}$ is determined by following equation.

$$n_{PUCCH}^{(1)} = (M-m-1) \times N_p + m \times N_{p+1} + n_{CCE} + N_{PUCCH}^{(1)} \quad \text{[Equation 8]}$$

Where $N_{PUCCH}^{(1)}$ is configured by higher layers. $n_{CCE}$ is the number of the first CCE used for transmission of the corresponding PDCCH in subframe $n-k_m$ and the corresponding m, where $k_m$ is the smallest value in set K such that UE detects a PDCCH in subframe $n-k_m$. NP is determined by following equation.

$$N_p = \max\{0, \lfloor [N_{RB}^{DL} \times (N_{sc}^{RB} \times p - 4)]/36 \rfloor\} \quad \text{[Equation 9]}$$

$N_{RB}^{DL}$ is a DL bandwidth configuration, and expressed in a unit of $N_{sc}^{RB}$. $N_{sc}^{RB}$ is a size of resource blocks in frequency region and expressed as a number of subcarrier.

If there is only a PDSCH transmission where there is not a corresponding PDCCH detected within subframe(s) n−k, where k∈K and K is defined in Table 3, the value of $n_{PUCCH}^{(1)}$ is determined according to higher layer configuration.

For TDD ACK/NACK multiplexing and sub-frame n with M>1, where M is the number of elements in the set K defined in Table 3, denote $n_{PUCCH,i}^{(1)}$ as the ACK/NACK resource derived from sub-frame $n-k_i$ and HARQ-ACK(i) as the ACK/NACK/DTX response from sub-frame $n-k_i$, where $k_i \in K$ and $0 \le i \le M-1$.

For a PDSCH transmission or a PDCCH indicating downlink SPS release in sub-frame $n-k_i$ where $k_i \in K$, the ACK/NACK resource $n_{PUCCH,i}^{(1)}$ is determined by following equation.

$$n_{PUCCH,i}^{(1)} = (M-i-1) \times N_p + i \times N_{p+1} + n_{CCE,i} + N_{PUCCH}^{(1)} \quad \text{[Equation 10]}$$

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, K=4 is given in subframe 9 in case of UL-DL configuration 0, ACK/NACK may be transmitted in UL subframe 9 in response to DL data received in DL subframe 5(=9-4). The way to determine PUCCH resource index in ACK/NACK transmission in a TDD system follows.

First, M is the number of elements in the set K defined in Table 3. For example, the number of elements in the set K for subframe 2 is 1 in case of UL-DL configuration 0, and Where p is selected from $\{0, 1, 2, 3\}$ such that $N_p \le n_{CCE,i} < N_{p+1}$, $n_{CCE,i}$ is the number of the first CCE used for transmission of the corresponding PDCCH in subframe $n-k_i$, and $N_{PUCCH}^{(1)}$ is configured by higher layers. $N_P$ is determined according to Equation 9.

For a PDSCH transmission where there is not a corresponding PDCCH detected in subframe $n-k_i$, the value of $n_{PUCCH,i}^{(1)}$ determined according to higher layer configuration.

The UE transmits bits b(0), b(1) on an ACK/NACK resource $n_{PUCCH}^{(1)}$ using PUCCH format 1b in subframe n. The value 'b(0), b(1)' and the ACK/NACK resource $n_{PUCCH}^{(1)}$ may be generated by channel selection according to the following Tables 4, 5, and 6. Tables 4, 5, and 6 show ACK/NACK multiplexing transmission when M=2, M=3, and M=4, respectively. If 'b(0), b(1)' is mapped to NACK/ACK, the UE does not transmit an ACK/NACK response in subframe n.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 5

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Tables 4, 5, and 6, HARQ-ACK(i) indicates a HARQ ACK/NACK/DTX result for an i-th data unit ($0 \le i \le 3$). DTX means that there is no data unit transmitted for corresponding HARQ-ACK(i) or the data unit corresponding to HARQ-ACK(i) has not been detected by the UE. In this specification, HARQ-ACK is used interchangeably with ACK/NACK. A maximum of four PUCCH resources (i.e. $n_{PUCCH,0}^{(1)}$ to $n_{PUCCH,3}^{(1)}$) may be occupied for each data unit. Multiplexed ACK/NACK signals are transmitted through one PUCCH resource selected from among the occupied PUCCH resources. In Tables 5, 6, and 7, $n_{PUCCH,x}^{(1)}$ indicates a PUCCH resource used for actual ACK/NACK transmission, and 'b(0)b(1)' indicates two bits transmitted through the selected PUCCH resource, which is modulated using QPSK. For example, if the UE successfully decodes four data units as in Table 7, the UE transmits (1, 1) to the BS through a PUCCH resource connected to $n_{PUCCH,1}^{(1)}$. Since combinations of PUCCH resources and QPSK symbols cannot represent all of available ACK/NACK, NACK and DTX are coupled (expressed as NACK/DTX) except in some cases.

Figure 6:
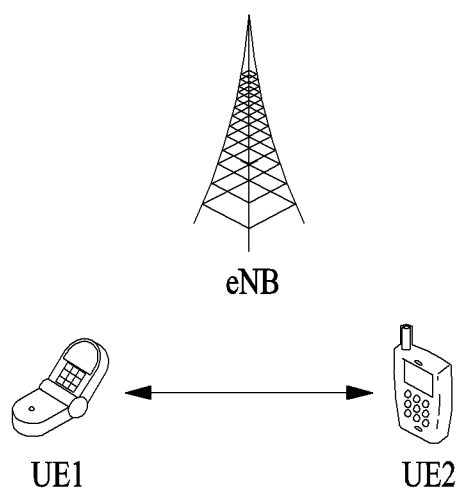
FIG. 6 is a diagram showing a network structure of D2D communication according to one embodiment of the present invention.

FIG. 6 is a diagram showing a network structure of D2D communication according to one embodiment of the present invention. D2D communication means a wireless communication method for performing direct communication between a UE (UE1) for performing a transmission operation and a UE (UE2) for performing a reception operation without an eNodeB. Assume that the UE1 and the UE2 subscribe to the same operator and are connected to the same serving cell. That is, the uE1 and the UE2 operate in the same downlink and uplink frequency band and any one of the downlink or uplink frequency band may be used for D2D communication.

In addition, the embodiment(s) of the present invention are also applicable to the case in which the UE1 and the UE2 subscribe to different operators or the case in which the UE1 and the UE2 are connected to different serving cells.

In the embodiment of the present invention, assume that resources for D2D communication are assigned by the eNodeB. This resource assignment information may be transmitted via D2D scheduling information of a downlink control channel. The D2D scheduling information may be regarded as UL grant from the viewpoint of the transmission UE because the transmission UE performs UL transmission according to an instruction of the eNodeB. From the viewpoint of the reception UE, the D2D scheduling information may be regarded as DL assignment.

Accordingly, the transmission UE may detect a control channel via which the D2D scheduling information is transmitted and transmit data through D2D resources included in or corresponding to the D2D scheduling information. In response thereto, the reception UE may detect the control channel via which the D2D scheduling information is transmitted and receive data via D2D resources included in or corresponding to the D2D scheduling information. Due to characteristics of D2D communication, D2D resources for the transmission UE and D2D resources for the reception UE may indicate the same (time-frequency) resource region. The reception UE may feed information indicating whether the data transmitted by the transmission UE has been successfully received back to the eNodeB after a predetermined time or after a predetermined subframe.

Figure 7:
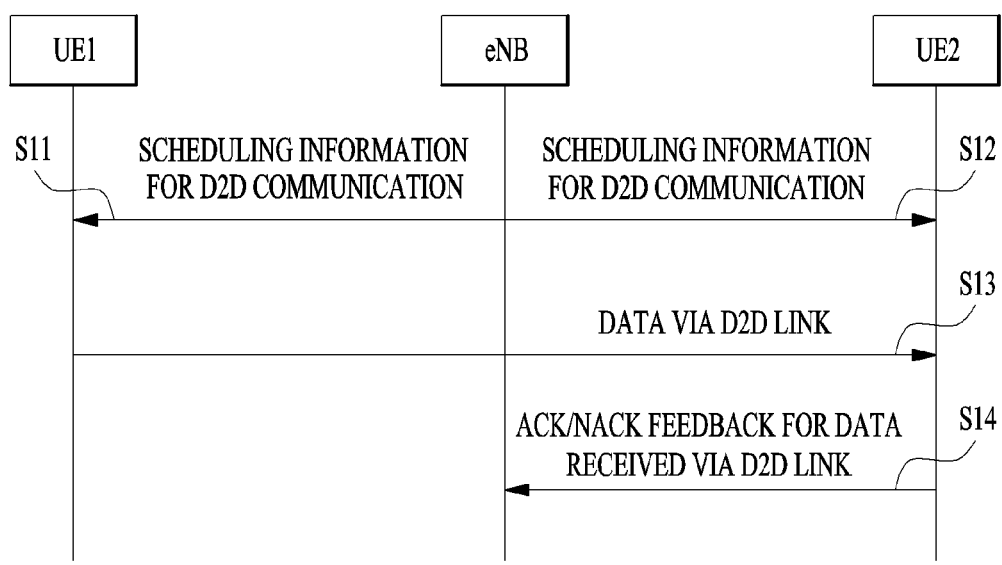
FIG. 7 is a diagram showing an example of transmission/reception operations of D2D communication according to one embodiment of the present invention.

FIG. 7 is a diagram showing an example of operations for D2D communication according to one embodiment of the present invention. More specifically, FIG. 7 shows operations of scheduling for D2D communication, data transmission and reception and ACK/NACK feedback. FIG. 7 shows a process after a discovery procedure for D2D communication and a setup procedure have already been completed. The eNB may transmit scheduling information for D2D communication to the UE1 and the UE2 determined as a D2D communication pair (S11 and S12). The UE 1 and the UE2 may detect the scheduling information and receive resource information for D2D communication. The UE1 and the UE2 may perform D2D communication according to the resource information (S13). Then, the UE corresponding to the receiver of D2D communication may feed ACK/NACK for data reception of D2D communication back to the eNodeB (S14).

At this time, the same parameters as those used for ACK/NACK transmission in communication (that is, non-D2D communication) with the eNodeB may be reused as parameters for transmission of ACK/NACK such as transmit power or scrambling sequence, etc.) and may be different from parameters for data transmission in a D2D link. For example, transmit power of data transmitted via a D2D link may be adjusted according to path loss between two UEs or fixed to a predetermined level in consideration of a channel state between two neighboring UEs, whereas transmit power of the ACK/NACK signal may be determined based on path loss between the eNodeB and the UE because the eNodeB receives the ACK/NACK signal.

In D2D communication, the same parameters as those used for transmission of the ACK/NACK in communication with the eNodeB may be reused as parameters (transmit power, scrambling sequence, etc.) for transmission of the ACK/NACK from the reception UE to the eNodeB but an existing method for determining resources used to transmit ACK/NACK may not be used.

In a 3GPP LTE(-A) system, ACK/NACK for a signal received on a subframe #n is transmitted on a subframe #n+m. At this time, m is a minimum integer for enabling a subframe #n+m to become a UL subframe, among integers equal to or greater than a predetermined value (e.g., 4 which is a basic processing time in an LTE(-A) system) in order to guarantee a time for decoding a downlink signal. Resources to be used for ACK/NACK transmission on the subframe #n+m are determined from a PDCCH via which DL assignment is transmitted. More specifically, the UE confirms a first index k among CCEs used to transmit DL assignment and transmits ACK/NACK using PUCCH resources corresponding to $N_{offset}^{PUCCH+k}$ obtained by adding the CCE index k to an offset $N_{offset}^{PUCCH}$ indicating start of a PUCCH resource region used for ACK/NACK.

Such a process may operate without any problems because a decoding time is sufficiently guaranteed if data scheduled via DL assignment transmitted on the subframe #n is received on the subframe #n. However, if a subframe, on which scheduling information for data transmission and reception in D2D communication is transmitted, and a subframe, to which data transmission is assigned, are different, ACK/NACK may not be transmitted on the subframe #n+m. More specifically, ACK/NACK resources for D2D communication and ACK/NACK resources for non-D2D communication may collide. An ACK/NACK transmission resource region of a PUCCH may be determined via a CCE index, to which DL of a PDCCH is assigned (a CCE index, to which D2D scheduling information is assigned, in case of D2D communication). In such an environment, after the D2D scheduling information is assigned to the UE and before the UE feeds ACK/NACK for D2D data reception back, when another DL assignment (e.g., for non-D2D communication for a third UE) is transmitted using the same CCE index, ACK/NACK corresponding to the transmitted DL assignment and ACK/NACK for D2D transmission are set to use the same resources. That is, resource collision for ACK/NACK may occur.

Figure 8:
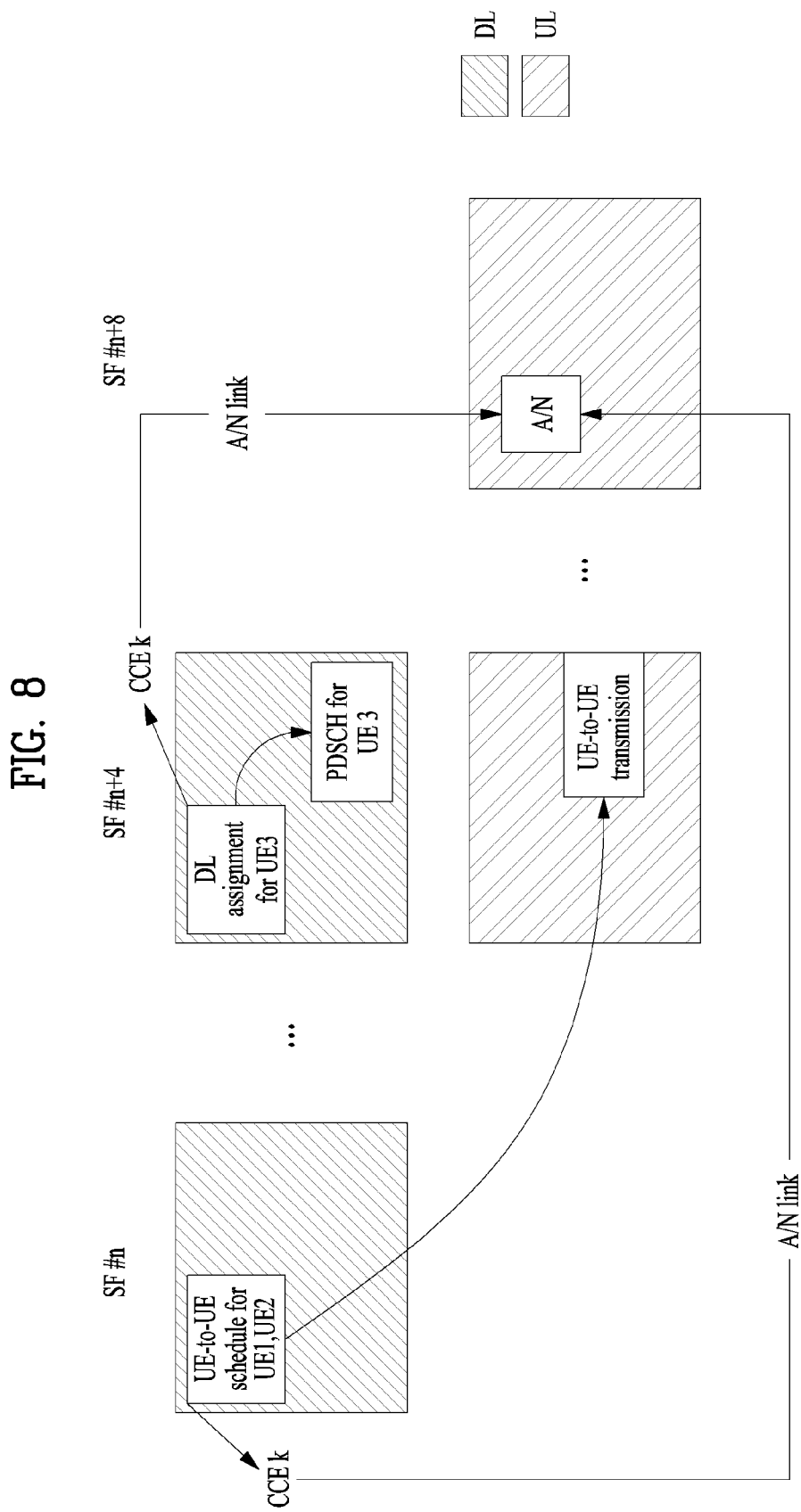
FIG. 8 is a diagram showing an example of collision between ACK/NACK resources for D2D communication and ACK/NACK resources for non-D2D communication.

FIG. 8 shows an example of ACK/NACK resource collision occurring in a frequency division duplex (FDD) LTE(-A) system. In FIG. 8, on the assumption of m=4, ACK/NACK for data received on a subframe (SF) n is transmitted on SF #n+4. On SF #n, D2D scheduling information is transmitted via a control channel of a first frequency band (e.g., downlink). At this time, transmission for D2D communication is assigned in a second band (e.g., uplink) and the UE1 is assigned resources for transmitting D2D data on SF #n+4 of the second frequency band. In addition, the UE2 which is a D2D communication counterpart of the UE1 is configured to receive data in the same resource region as resources for transmission of the UE1 by the D2D scheduling information. The UE2 feeds back ACK/NACK for the D2D data received on SF #n+4 of the second frequency band on SF #n+8. However, resources for ACK/NACK may collide with ACK/NACK resources assigned to the data transmitted on SF #n+4 of the first frequency band.

For example, if D2D scheduling information (e.g., reception scheduling information) is transmitted to the UE2 at a CCE index k on SF #n of the first frequency band, ACK/NACK is transmitted using PUCCH resources corresponding to $N_{offset}^{PUCCH+k}$ obtained by adding the CCE index k to $N_{offset}^{PUCCH}$ which is an offset indicating start of a PUCCH resource region of SF #n+8 of the second frequency band. However, ACK/NACK for data of SF #n+4 of the first frequency band is also transmitted on SF #n+8. If downlink scheduling information is transmitted to the UE3 using the CCE index k on SF #n+4 of the first frequency band, the UE3, which has received the downlink data on SF #n+4, is configured to transmit ACK/NACK using PUCCH resources corresponding to $N_{offset}^{PUCCH+k}$.

Such ACK/NACK resource collision is due to unique characteristics of D2D communication. That is, in D2D communication, unlike non-D2D communication, the eNodeB should schedule transmission/reception resources of a pair of UEs. Accordingly, while only one of downlink (DL) assignment (or grant) or uplink (UL) assignment (or grant) is scheduled to one UE in non-D2D communication, (DL-UL pair) scheduling information is transmitted to the pair of UEs in D2D communication. In particular, since a reception UE is necessarily involved in D2D communication, ACK/NACK feedback is necessary. In addition, since frequency band switching is necessary in D2D communication, a time necessary for switching into a frequency band for D2D communication by a reception UE or a transmission UE is required.

Accordingly, in the present specification, the following solutions are proposed in order to solve the ACK/NACK resource collision problem.

In one embodiment of the present invention, ACK/NACK resources for D2D communication are assigned independent of ACK/NACK resources for non-D2D communication. For example, a specific region of a PUCCH may be assigned as ACK/NACK resources for D2D communication. ACK/NACK resources may be assigned if a D2D link is activated and released if the D2D link is deactivated. Alternatively, a specific CCE region may be separately assigned for D2D scheduling information.

In another embodiment of the present invention, D2D scheduling information may be configured to be individually transmitted to a transmission UE and a reception UE at different times so as to prevent ACK/NACK resource collision. Therefore, it is possible to prevent several pieces of downlink scheduling information from being linked to one ACK/NACK resource. More specifically, reception scheduling information of the reception UE of the D2D scheduling information may be configured to be transmitted to the reception UE on a control channel, to which ACK/NACK resources for D2D communication are linked, and transmission scheduling information may be configured to be transmitted to the transmission UE on a preceding control channel.

For example, in case of FDD, data transmission and ACK/NACK are synchronously mapped in one-to-one correspondence. In general, ACK/NACK for data received on SF #n is transmitted on SF #n+4. In addition, granted uplink transmission resources may be implicitly determined. In general, uplink transmission resources for UL grant on SF #n are assigned to SF #n+4.

If it is assumed that UL resources are used for D2D communication, D2D scheduling information transmitted to the transmission UE is configured in the form of UL grant and D2D scheduling information transmitted to the reception UE is configured in the form of DL assignment.

If D2D communication is performed on UL SF #n+4, since resources for UL grant on SF #n are assigned to SF #n+4, D2D scheduling information, that is, transmission scheduling information, is transmitted to the transmission UE on DL SF #n. That is, when the transmission UE receives UL grant on DL SF #n, data is configured to be transmitted to the reception UE on UL SF #n+4. In addition, since ACK/NACK for the data received on SF #n is transmitted on SF #n+4, the reception UE, which has received data on UL SF #n+4, is configured to transmit ACK/NACK on UL SF #n+8. Accordingly, D2D scheduling information, that is, reception scheduling information, is transmitted to the reception UE on DL SF #n+4.

When the eNodeB transmits D2D scheduling information to the transmission UE on DL SF #n and transmits D2D scheduling information (reception scheduling information) to the reception UE on DL SF #n+4, ACK/NACK resource collision does not occur. This is because an ACK/NACK resource region for D2D communication of UL SF #n+8 is linked to D2D scheduling information transmitted on DL SF #n+4. Other ACK/NACK transmitted on UL SF #n+8 is for data (e.g., a PDSCH) scheduled on SF #n+4 and a CCE region corresponding to scheduling and a CCE region of the D2D scheduling information are exclusive.

In other words, if the reception scheduling information is transmitted to the UE2 using CCE #1 on DL SF #n+4, downlink scheduling information transmitted to another arbitrary UE which receives a PDSCH on DL SF #n+4, that is, the UE3, cannot use CCE #1. The UE2, which has received D2D communication data on UL SF #n+4, transmits ACK/NACK using PUCCH resources corresponding to $N_{offset}^{PUCCH+1}$ on UL SF #n+8 and the ACK/NACK of the UE3, which has received a PDSCH on DL SF #n+4, uses resources different from PUCCH resources corresponding to $N_{offset}^{PUCCH+1}$. Therefore, it is possible to prevent collision between ACK/NACK resources for D2D communication and ACK/NACK resources for non-D2D communication. It is possible to improve resource assignment or use efficiency by preventing resource collision. In addition, since an ACK/NACK operation of D2D communication may be performed by separately providing a transmission (or reception) time of D2D scheduling information to the transmission UE and the reception UE without changing UL grant and UL transmission based on the same, DL assignment and DL reception based on the same, and a UL feedback (ACK/NACK) operation, compatibility with an existing communication standard can be achieved.

Figure 9:
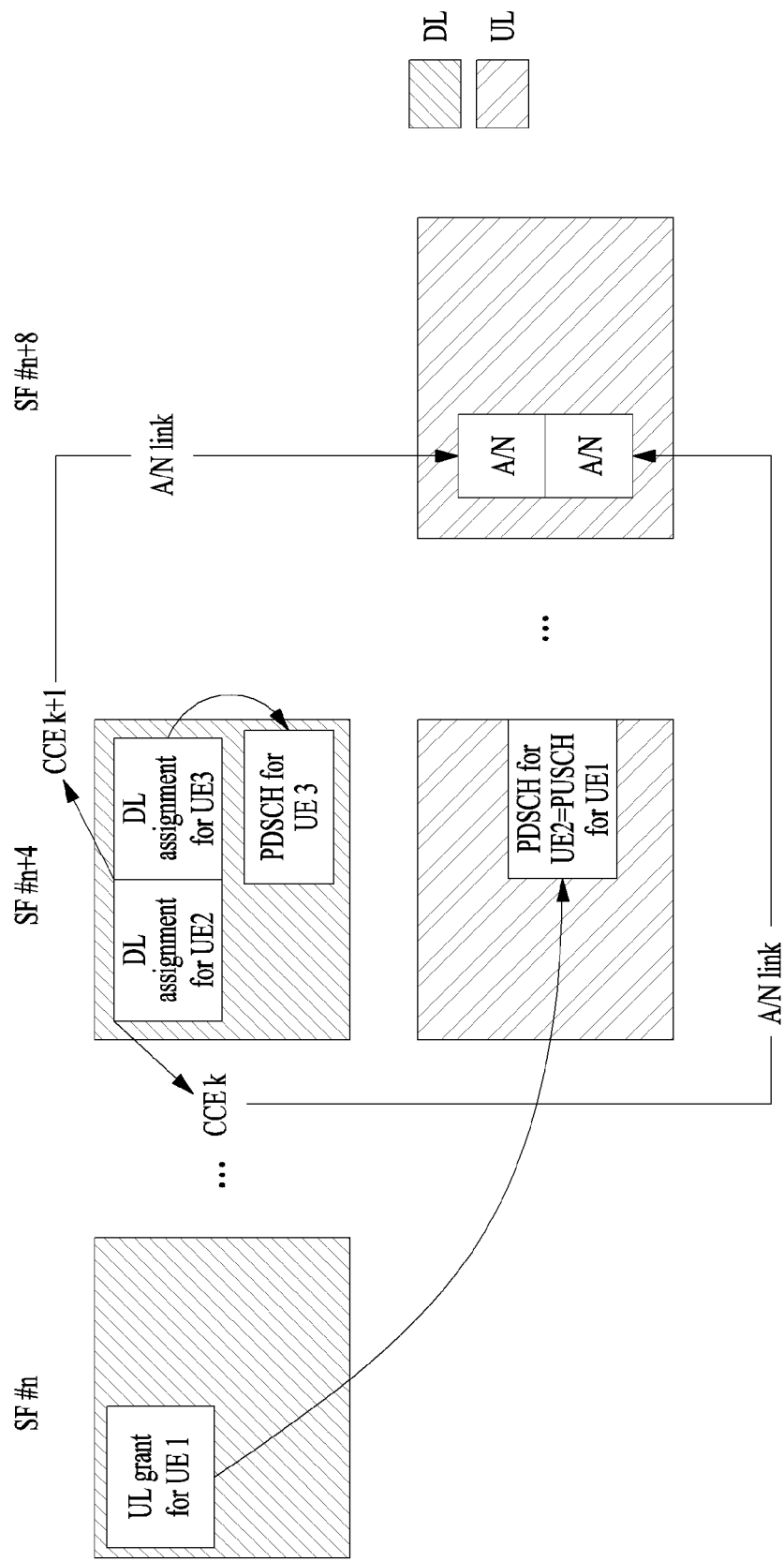
FIG. 9 is a diagram showing an example of ACK/NACK resource assignment for D2D communication according to one embodiment of the present invention.

FIG. 9 shows transmission and reception of D2D scheduling information and ACK/NACK feedback according to one embodiment of the present invention. In this case, ACK/NACK resources for D2D communication and resources for non-D2D communication do not collide.

Figure 10:
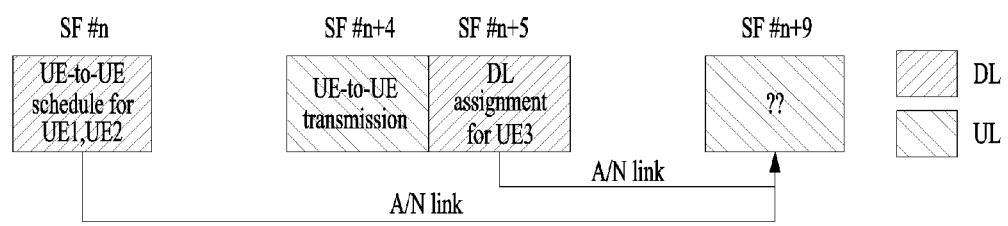
FIG. 10 is a diagram showing an example of collision between ACK/NACK resources for D2D communication and ACK/NACK resources for non-D2D communication.

FIG. 10 shows an example of ACK/NACK resource collision occurring in a time division duplex (TDD) LTE(-A) system. Even in a TDD system, similarly to an FDD system shown in FIG. 10, ACK/NACK resources for D2D communication and ACK/NACK resources for non-D2D communication collide.

Figure 11:
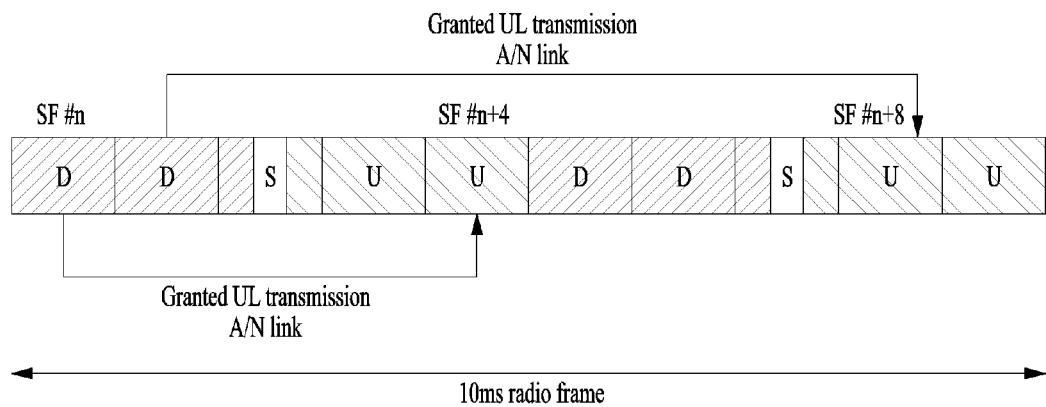
FIG. 11 is a diagram showing an example of ACK/NACK resource assignment for D2D communication according to one embodiment of the present invention.

FIG. 11 shows a subframe structure of a TDD system to which one embodiment of the present invention is applicable. In case of TDD, a relationship among resource grant, transmission and ACK/NACK may be differently defined according to configuration (see Table 3). FIG. 11 shows an example corresponding to configuration 1.

Figure 12:
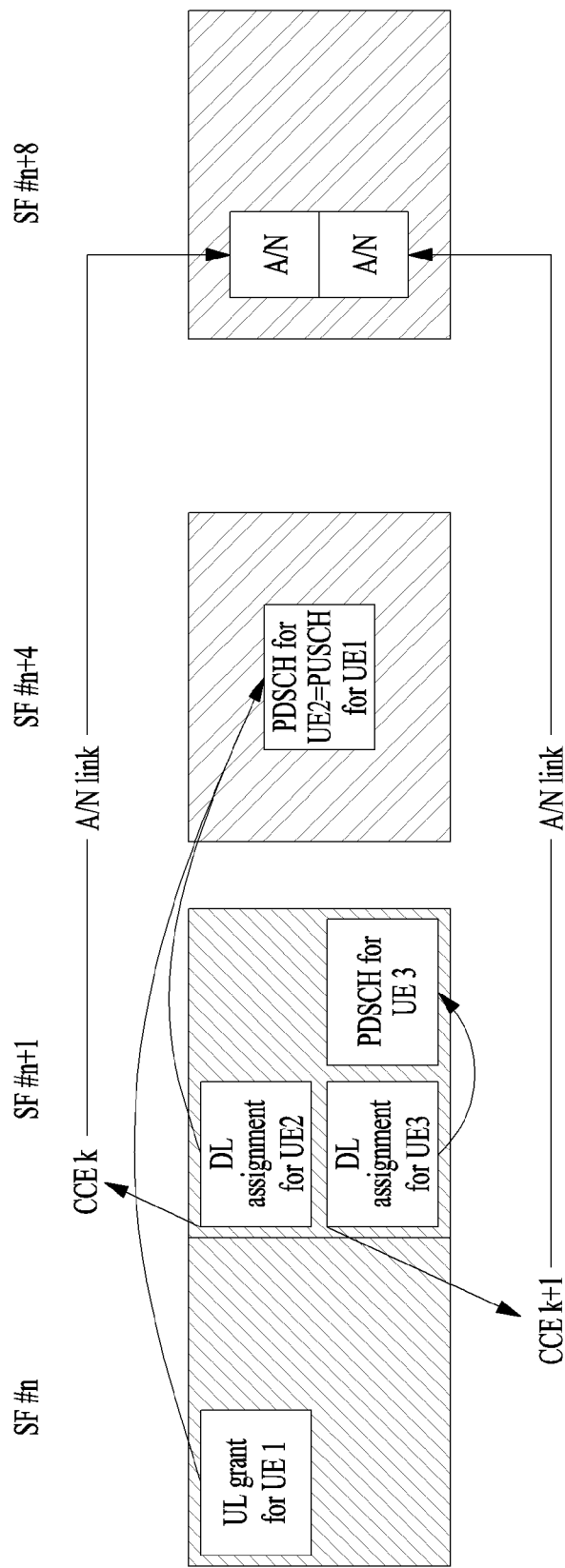
FIG. 12 is a diagram showing an example of ACK/NACK resource assignment for D2D communication according to one embodiment of the present invention.

Even in a TDD system, similarly to an FDD system, if it is assumed that D2D communication is performed using UL resources of SF #n+4, D2D scheduling information is transmitted to the transmission UE on SF #n in the form of UL grant (UL transmission resources for UL grant on SF #n are assigned to SF #n+4). In addition, since ACK/NACK for data DL-assigned on #n+1 is transmitted on SF #n+8, D2D scheduling information is transmitted to the reception UE on SF #n+1 in the form of DL assignment. At this time, since resource allocation (RA) information including DL assignment is for D2D communication resources of SF #n+4 and ACK/NACK resources allocated to SF #n+8 are linked to D2D scheduling information of SF #n+1, ACK/NACK resource collision does not occur. FIG. 12 shows transmission and reception of D2D scheduling information in a TDD system and ACK/NACK feedback therefor according to one embodiment of the present invention.

In FIGS. 9 and 12, D2D scheduling information transmitted to the transmission UE is denoted by UL grant and D2D scheduling information transmitted to the reception UE is denoted by DL assignment. However, since transmission schedule and reception schedule are assigned to the same radio resources in communication between UEs, any one UE can perform an irregular operation such as a reception operation using UL resources or a transmission operation using DL resources.

Accordingly, D2D scheduling information is defined as assignment masked with an ID (e.g., a group ID of the UE1 and the UE2) different from that used for communication with the eNodeB. That is, D2D scheduling information transmitted to the reception UE is defined as DL assignment masked with a separate ID and D2D scheduling information transmitted to the transmission UE may be UL grant masked with a separate ID.

For example, if D2D communication is performed using UL resources, UL grant is masked with a separate ID to be used as D2D scheduling information. Both the transmission UE and the reception UE receive the UL grant, which is recognized as D2D scheduling information. At this time, UL grant may have a new DCI format including the ID of the transmission UE, in order to indicate a transmission UE which has received D2D scheduling information in a UE group. The UE may recognize that data should be transmitted using resources granted by UL grant if an ID thereof is included in the received UL grant and recognize that the transmission UE will transmit data thereto using resources granted by the UL grant and thus data should be received using the resources if an ID thereof is not included in the received UL grant. The reception UE cancels transmission and operates in a D2D reception mode if UL transmission is reserved at a D2D transmission/reception time of the UL grant. That is, a periodic CSI report, which is periodic UL transmission for D2D data reception, periodic sounding reference signal (SRS) transmission, semi persistent scheduling (SPS) transmission, etc. may be cancelled. The transmission UE may cancel UL transmission and use the resources for D2D communication if D2D resources granted by UL grant collide with other UL transmission resources transmitted periodically.

D2D scheduling information transmitted to the reception UE is defined as DL assignment masked with a separate ID and the UE, which has received such DL assignment, recognizes that the DL assignment is for UL resources. In particular, in a TDD system, a UL SF index may be further included.

Masking UL grant for D2D communication with a group ID and receiving the UL grant by transmission and reception UEs is more advantageous than the case in which only the transmission UE receives UL grant. That is, when the reception UE is aware of on which SF D2D data is transmitted before receiving DL assignment, D2D resource assignment is more flexible.

Figure 13:
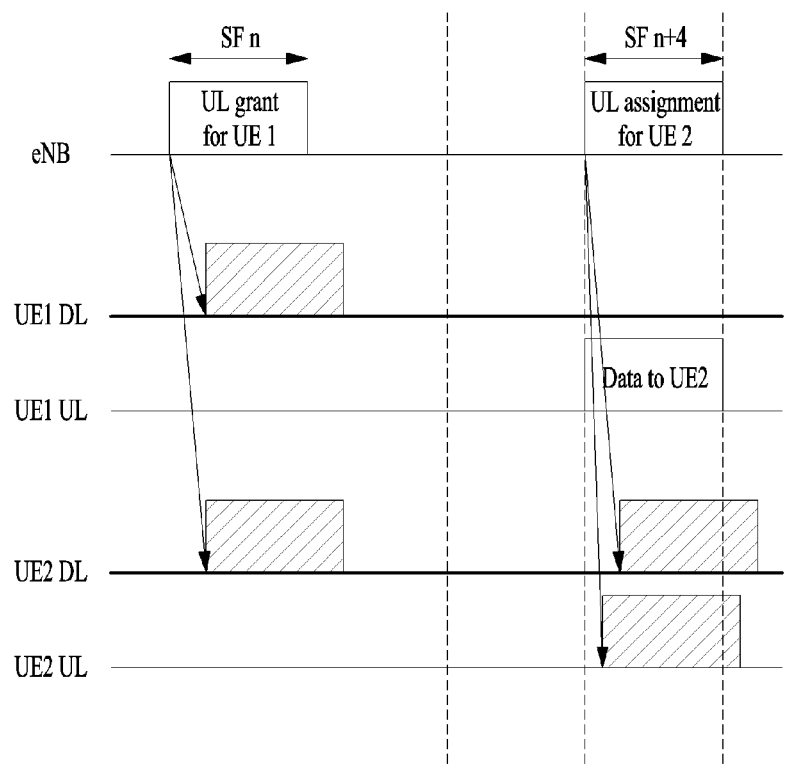
FIG. 13 is a diagram showing an example of a data reception method for D2D communication according to one embodiment of the present invention.

When the reception UE is aware of a D2D data transmission region after receiving DL assignment from the eNodeB, D2D transmission is performed such that data reception from the transmission UE starts after the reception UE receives DL assignment from the eNodeB in consideration of propagation delay between the reception UE and the eNodeB and between the UEs. In contrast, if on which SF D2D transmission is performed is known, buffering may be performed on the SF without restriction such that D2D data may be received even when reception of DL assignment is not completed. For example, as shown in FIG. 13, when the UE2 receives UL grant on SF #n, the UE1 transmitting data on SF #n+4 is recognized in advance. Accordingly, the UE may buffer D2D data transmitted by the UE1 before DL assignment is received on SF #n+4.

Figure 14:
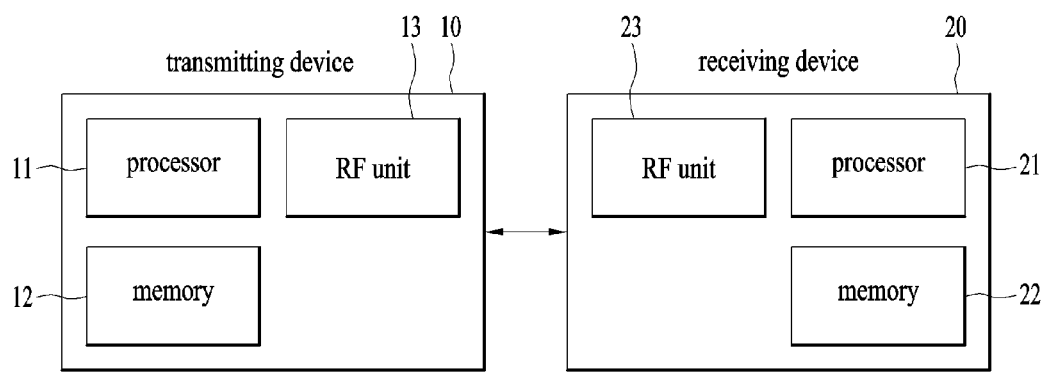
FIG. 14 is a block diagram showing a device configured to implement the present invention.

FIG. 14 is a block diagram of a device performing operation related to D2D communication according to exemplary embodiments of the present invention. The transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

Specific configuration of the UE or the eNB functioning the transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a UE, a relay, an eNB, etc.

The invention claimed is:

1. A method for performing, by a first user equipment (UE), device-to-device (D2D) communication between the first UE and a second UE in a wireless communication system, the method comprising:
receiving, from a base station (BS), reception scheduling information indicating specific resources on which the first UE receives data for D2D communication from the second UE in a first frequency band;
receiving, from the second UE, the data for D2D communication on the specific resources in a second frequency band, wherein the first frequency band is different than the second frequency band; and
transmitting, to the BS, feedback information in response to reception of the data for D2D communication in the second frequency band,
wherein the reception scheduling information is received in a subframe different from a subframe including transmission scheduling information, which is transmitted from the BS to the second UE, indicating the specific resources on which the second UE transmits the data for D2D communication to the first UE.

2. The method according to claim 1, wherein the reception scheduling information and the transmission scheduling information indicate identical time-frequency resources.

3. The method according to claim 1, wherein the transmission scheduling information is included in an n-th subframe of the first frequency band and the reception scheduling information is received in an (n+m)-th subframe of the first frequency band, where n and m are positive integers.

4. The method according to claim 1, wherein the data for D2D communication is received in a subframe of the second frequency band having the same index as the index of a subframe of the first frequency band, in which the reception scheduling information is received.

5. A method for supporting, by a base station (BS), device-to-device (D2D) communication between a first user equipment (UE) and a second UE in a wireless communication system, the method comprising:
transmitting, to the second UE, transmission scheduling information indicating specific resources on which the second UE transmits data for D2D communication to the first UE in a first frequency band;
transmitting, to the first UE, reception scheduling information indicating the specific resources on which the first UE receives the data for D2D communication from the second UE in the first frequency band; and
receiving, from the first UE, feedback information in response to reception of the data for D2D communication in a second frequency band, wherein the first frequency band is different than the second frequency band,
wherein the transmission scheduling information and the reception scheduling information are transmitted in different subframes in the first frequency band.

6. The method according to claim 5, wherein the reception scheduling information and the transmission scheduling information indicate identical time-frequency resources.

7. The method according to claim 5, wherein the transmission scheduling information is transmitted in an n-th subframe of the first frequency band and the reception scheduling information is transmitted in an (n+m)-th subframe of the first frequency band, where n and m are positive integers.

8. The method according to claim 5, wherein a transmission of the data for D2D communication is performed in a subframe of the second frequency band having the same index as the index of a subframe of the first frequency band, in which the reception scheduling information is transmitted.

9. A first user equipment (UE) configured to perform device-to-device (D2D) communication with a second UE in a wireless communication system, the first UE comprising:
a radio frequency (RF) unit configured to transmit or receive an RF signal; and
a processor configured to control the RF unit,
wherein the processor is configured to receive, from a base station (BS), reception scheduling information indicating specific resources on which the first UE receives data for D2D communication from the second UE in a first frequency band, to receive, from the second UE, the data for D2D communication on the specific resources in a second frequency band, in response to reception of the data for D2D communication in the second frequency band, wherein the first frequency band is different than the second frequency band,
wherein the reception scheduling information is received in a subframe different from a subframe in which transmission scheduling information, which is transmitted from the BS to the second UE, indicating the specific resources on which the second UE transmits the data for D2D communication to the first UE.

10. The first UE according to claim 9, wherein the reception scheduling information and the transmission scheduling information indicate identical time-frequency resources.

11. The first UE according to claim 9, wherein the transmission scheduling information is included in an n-th subframe of the first frequency band and the reception scheduling information is received in an (n+m)-th subframe of the first frequency band, where n and m are positive integers.

12. The first UE according to claim 9, wherein the data for D2D communication is received in a subframe of the second frequency band having the same index as the index of a subframe of the first frequency band, in which the reception scheduling information is received.

13. A base station (BS) configured to support device-to-device (D2D) communication between a first user equipment (UE) and a second UE in a wireless communication system, the base station comprising:
a radio frequency (RF) unit configured to transmit or receive an RF signal; and
a processor configured to control the RF unit,
wherein the processor is configured to transmit, to the second UE, transmission scheduling information indicating specific resources on which the second UE transmits data for D2D communication to the first UE in a first frequency band, to transmit, to the first UE, reception scheduling information indicating the specific resources on which the first UE receives the data for D2D communication from the second UE in the first frequency band, and to receive, from the first UE, feedback information in response to reception of the data for D2D communication in a second frequency band, wherein the first frequency band is different than the second frequency band, wherein the transmission scheduling information and the reception scheduling information are transmitted in different subframes in the first frequency band.

14. The base station according to claim 13, wherein the reception scheduling information and the transmission scheduling information indicate identical time-frequency resources.

15. The base station according to claim 13, wherein the transmission scheduling information is transmitted in an n-th subframe of the first frequency band and the reception scheduling information is transmitted in an (n+m)-th subframe of the first frequency band, where n and m are positive integers.

16. The base station according to claim 13, wherein a transmission of the data for D2D communication is performed in a subframe of the second frequency band having the same index as the index of a subframe of the first frequency band, in which the reception scheduling information is transmitted.

* * * * *